(12) United States Patent
Arisawa et al.

(10) Patent No.: US 9,941,810 B2
(45) Date of Patent: Apr. 10, 2018

(54) POWER CONVERSION DEVICE FOR CONVERTING AC POWER INTO DC POWER

(71) Applicant: Mitsubishi Electric Corporation, Tokyo (JP)

(72) Inventors: Koichi Arisawa, Tokyo (JP); Takashi Yamakawa, Tokyo (JP); Yuji Takayama, Tokyo (JP); Takuya Shimomugi, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/129,112

(22) PCT Filed: Jul. 8, 2014

(86) PCT No.: PCT/JP2014/068235
§ 371 (c)(1),
(2) Date: Sep. 26, 2016

(87) PCT Pub. No.: WO2016/006045
PCT Pub. Date: Jan. 14, 2016

(65) Prior Publication Data
US 2017/0149352 A1 May 25, 2017

(51) Int. Cl.
*H02M 7/06* (2006.01)
*H02M 1/12* (2006.01)
(Continued)

(52) U.S. Cl.
CPC ............... *H02M 7/06* (2013.01); *H02M 1/12* (2013.01); *H02M 1/42* (2013.01);
(Continued)

(58) Field of Classification Search
CPC . H02M 2001/0009; H02M 2001/0025; H02M 1/12; H02M 1/42; H02M 1/4208;
(Continued)

(56) References Cited

U.S. PATENT DOCUMENTS 6,181,583 B1 * 1/2001 Okui ................... H02M 1/4208
363/45
2007/0103947 A1 * 5/2007 Taguchi ................. H02M 1/12
363/45
(Continued)

FOREIGN PATENT DOCUMENTS

EP 2456062 A1 5/2012
JP 04-047387 U 4/1992
(Continued)

OTHER PUBLICATIONS

International Search Report of the International Searching Authority dated Sep. 30, 2014 for the corresponding International application No. PCT/JP2014/068235 (and English translation).
(Continued)

*Primary Examiner* — Fred E Finch, III
(74) *Attorney, Agent, or Firm* — Posz Law Group, PLC

(57) ABSTRACT

A power conversion device includes a rectifier circuit that converts an AC power from an AC power supply, into a DC power, a short-circuit unit that short-circuits the AC power supply via a reactor connected between the AC power supply and the rectifier circuit, a control unit that generates a plurality of drive signals to control the short-circuit unit in a half cycle of the AC power supply, and a smoothing capacitor. The control unit stepwise varies threshold values that limit a value of a power-supply current of the AC power supply, in an on-section or an off-section of the plurality of drive signals.

7 Claims, 11 Drawing Sheets

(51) Int. Cl.
*H02M 1/42* (2007.01)
*H02M 1/00* (2006.01)

(52) U.S. Cl.
CPC ............... *H02M 2001/0009* (2013.01); *H02M 2001/0025* (2013.01); *H02M 2001/4283* (2013.01)

(58) Field of Classification Search
CPC ........... H02M 2001/4283; H02M 7/06; H02M 7/066; H02M 7/08
See application file for complete search history.

(56) References Cited

U.S. PATENT DOCUMENTS

| | | | | |
|---|---|---|---|---|
| 2008/0130336 | A1 | 6/2008 | Taguchi | |
| 2010/0019809 | A1* | 1/2010 | Hwang | H02M 1/4208 327/129 |
| 2010/0109615 | A1* | 5/2010 | Hwang | G05F 1/70 323/205 |
| 2012/0155132 | A1 | 6/2012 | Uno | |
| 2013/0077370 | A1* | 3/2013 | Gu | H02M 1/4225 363/126 |
| 2014/0285163 | A1* | 9/2014 | Lin | H02M 1/42 323/205 |
| 2015/0061609 | A1* | 3/2015 | Cui | H02M 1/4225 323/210 |
| 2015/0318780 | A1* | 11/2015 | Davila | H02M 1/42 363/89 |
| 2016/0036317 | A1* | 2/2016 | Shimomugi | H02M 1/4225 363/53 |

FOREIGN PATENT DOCUMENTS

| | | |
|---|---|---|
| JP | 07-089743 B | 9/1995 |
| JP | 11-206130 A | 7/1999 |
| JP | 2003-153543 A | 5/2003 |
| JP | 2005-253284 A | 9/2005 |
| JP | 2009-100499 A | 5/2009 |
| JP | 2010-263775 A | 11/2010 |
| JP | 2011-101505 A | 5/2011 |
| JP | 2013-106455 A | 5/2013 |
| JP | 5316823 B2 | 10/2013 |
| JP | 2015-171196 A | 9/2015 |
| JP | 5868920 B2 | 1/2016 |

OTHER PUBLICATIONS

Extended EP Search Report dated Feb. 13, 2018 issued in corresponding EP patent application No. 14897183.1.

* cited by examiner

POWER CONVERSION DEVICE FOR CONVERTING AC POWER INTO DC POWER

CROSS REFERENCE TO RELATED APPLICATION

This application is a U.S. national stage application of International Patent Application No. PCT/JP2014/068235 filed on Jul. 8, 2014, the disclosure of which is incorporated herein by reference.

TECHNICAL FIELD

The present invention relates to a power conversion device that converts an AC power into a DC power.

BACKGROUND

In a conventional technology described in Patent Literature 1, a power factor improvement circuit that improves a power factor of a power supply to reduce a harmonic component included in an input current is disclosed. A full-wave rectification mode or a voltage doubler rectification mode is selected and a short-circuiting start time and a short-circuiting time in a short-circuit element are controlled by an open-loop, whereby a power factor improvement function and a boosting function are obtained. That is, in the conventional technology of Patent Literature 1, a switch for switching a rectifier circuit is turned on/off to control a rectifier circuit into the full-wave rectification mode or the voltage doubler rectification mode, thereby roughly classifying a DC output voltage of the power factor improvement circuit into two stages. A short-circuit variable control on the short-circuit element in the open-loop further classifies the regions provided by these two stages into two stages, the one providing no improvement in the power factor and the other improving the power factor, such that a DC output voltage region has four stages as a whole. This improves the power factor on a high load-side while increasing an output range of the DC output voltage.

In a conventional technology described in Patent Literature 2, there is provided a DC voltage control unit that outputs a DC voltage control signal in correspondence to a deviation value between a DC output voltage reference value, which is set in correspondence to a load, and a voltage between terminals of a smoothing capacitor. There is also provided a current reference calculation unit that outputs a current reference signal based on the product of a control signal from the DC voltage control unit and a sine wave-shaped synchronous signal synchronized with an AC power supply. On/off control on a switch element is performed at high frequency by comparison between this current reference signal and an AC-side current of a rectification element, and thus a DC output voltage is controlled into a desired value while an AC input current is controlled to have a sine wave-shape. As a result, it is possible to set a power factor of a power supply to 1 and reduce generation of harmonics.

PATENT LITERATURE

Patent Literature 1: Japanese Patent Application Laid-Open No. 11-206130
Patent Literature 2: Japanese Patent No. 2140103

However, according to the conventional technologies in Patent Literature 1 and Patent Literature 2, a control pattern for the short-circuit element is limited. That is, in these conventional technologies, the control pattern for the short-circuit element is limited to a harmonic switching mode of feeding back a current in a whole load region or a partial switching mode of the current open-loop control. Thus, in these conventional technologies, the short-circuit element is not operated in order to prevent the DC output voltage from being boosted too much in a low load region, and hence the power factor is not improved. Thus, a waveform distortion of an input current is so large in the low load region that the current including many harmonic components flows in a reactor and a reactor iron loss is increased. This decreases an AC/DC conversion efficiency of the power factor improvement circuit is decreased.

Also, in the conventional technology of Patent Literature 1, the short-circuit control on the short-circuit element in improving the power factor uses a partial switching system that controls the short-circuiting start time and the short-circuiting time in the open-loop such that the short-circuiting operation is performed only in a certain section in a cycle of the power supply. Such a system has a small effect on a high-load side providing a large harmonic generation amount, although it can improve the power factor and boost the DC output voltage. In order that an adequate power factor improvement effect, that is, the harmonic suppressing capability is obtained in the conventional technology in compliance with the future strict harmonic regulation, a reactor having a large inductance value is necessary. This causes problems, i.e., the decrease in AC/DC conversion efficiency, the increase in a circuit size, and the increase in cost. Also, when the DC output voltage is boosted with the harmonic generation amount being maintained at a certain level, the operation on the high-load side becomes unstable due to a limited boosting capability, or the range of choice of a load should be narrowed to allow for the safe operation on the high-load side.

SUMMARY

The present invention is provided in view of the forgoing, and an object of the invention is to obtain a power conversion device that can satisfy high booster capability and a harmonic standard while improving efficiency in a whole operation region of a load.

To solve the above problem and thus achieve the object, there is provided A power conversion device comprising: a rectifier circuit that converts an AC power from an AC power supply, into a DC power; a short-circuit unit that short-circuits the AC power supply via a reactor connected between the AC power supply and the rectifier circuit; and a control unit that generates a plurality of switching pulses to control the short-circuit unit, in a half cycle of the AC power supply, wherein the control unit stepwise varies threshold values that limit a value of a power-supply current of the AC power supply, in an on-section or an off-section of each of the switching pulses.

According to the present invention, the threshold values are varied stepwise, whereby a peak of a power-supply current in a half cycle of an AC power supply is suppressed and an effect of satisfying high booster capability and a harmonic standard while improving efficiency in a whole operation region of a load can be achieved.

DETAILED DESCRIPTION

Power conversion devices according to embodiments of the present invention will be described hereinbelow in detail with reference to the drawings. It is noted that the present invention is not limited to these embodiments.

First Embodiment.

Figure 1:
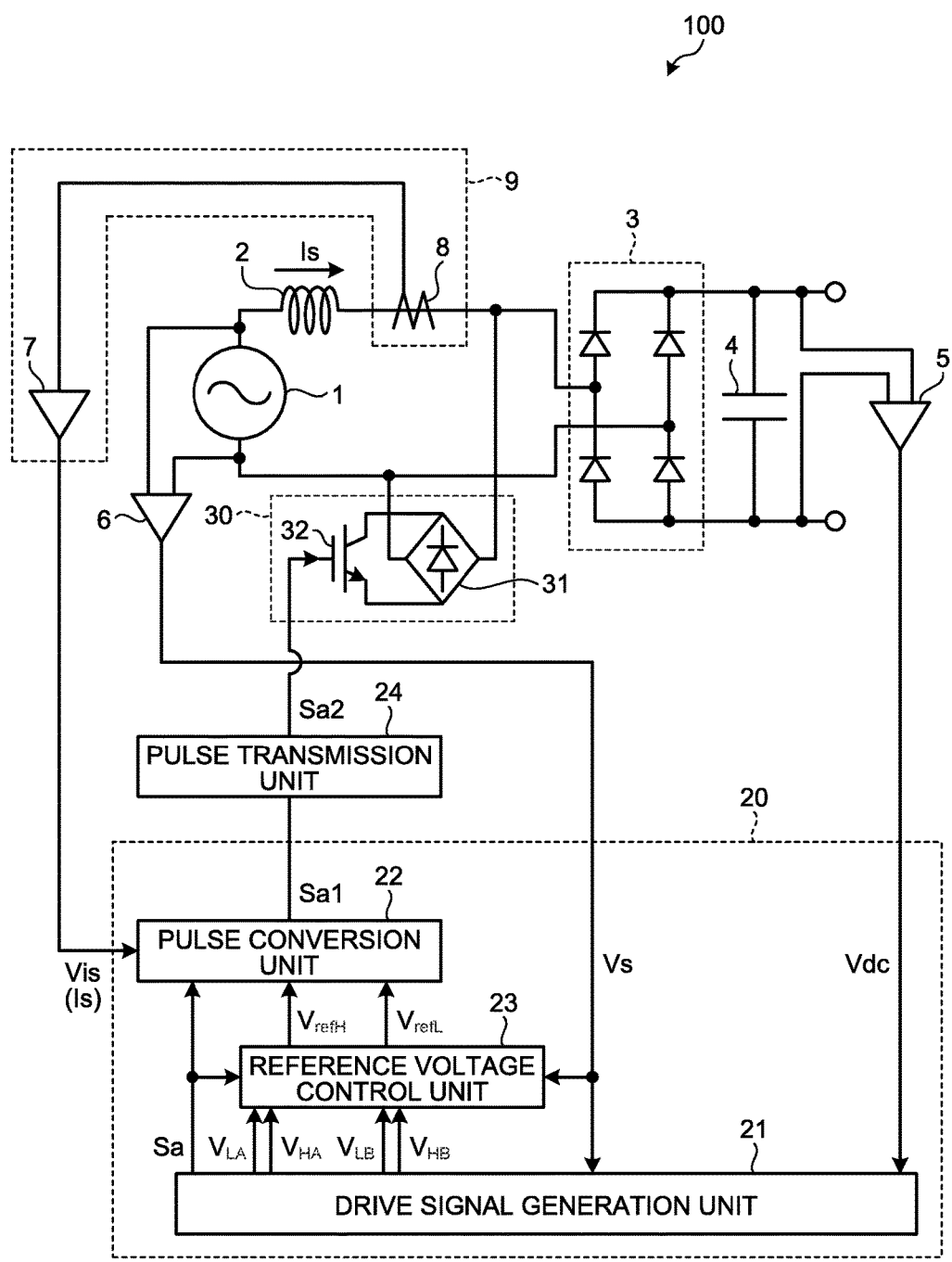
FIG. 1 is a diagram illustrating a configuration example of a power conversion device according to a first embodiment of the present invention.
Figure 2:
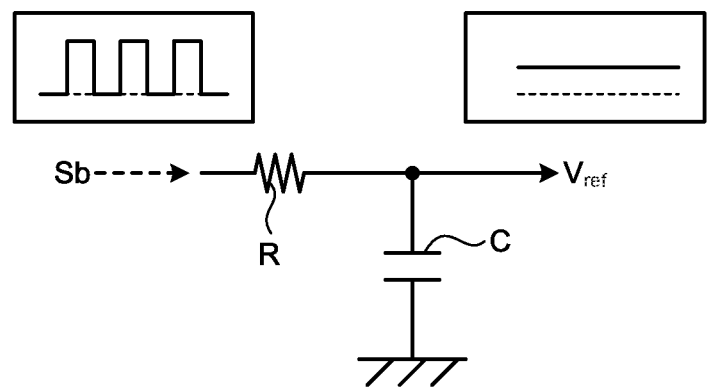
FIG. 2 is a first configuration diagram of a reference voltage generation circuit for pulse control.
Figure 3:
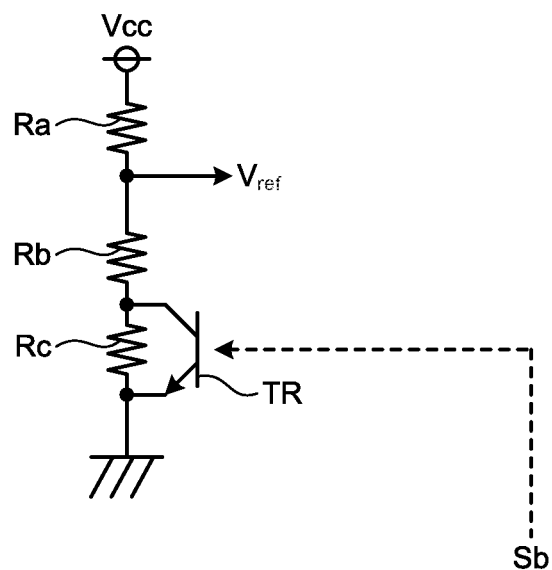
FIG. 3 is a second configuration diagram of a reference voltage generation circuit for pulse control.
Figure 4:
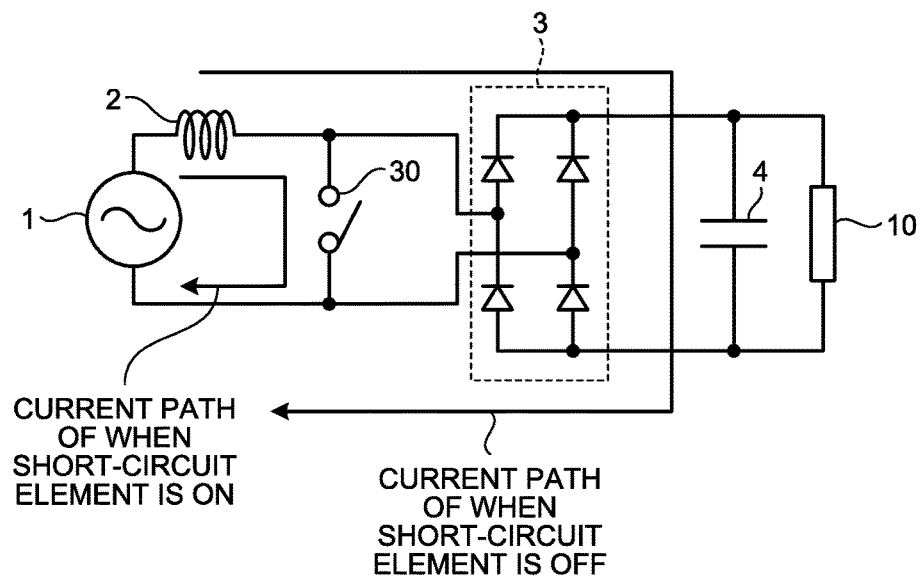
FIG. 4 is a diagram illustrating a simple circuit including a reactor, a short-circuit unit, a rectifier circuit, and a smoothing capacitor.
Figure 5:
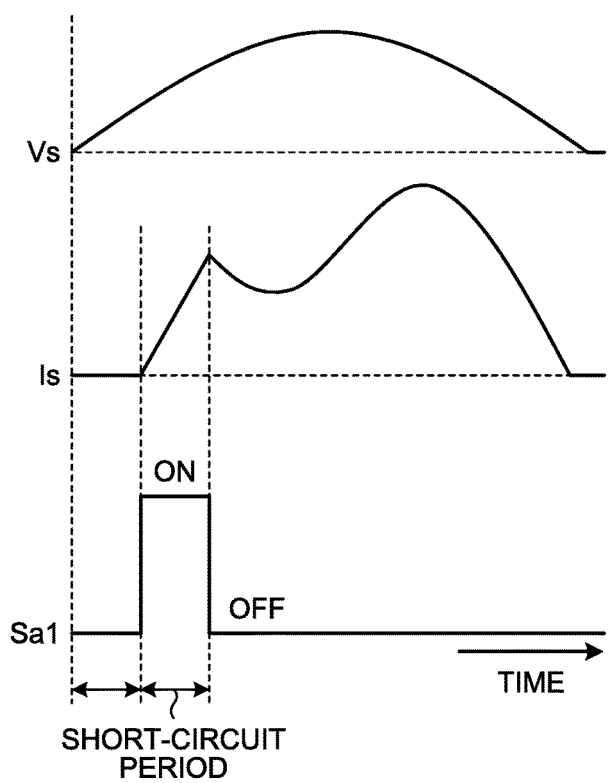
FIG. 5 is a diagram illustrating a waveform of a power-supply current when a short-circuit element is switched once in a half cycle on a positive side of an AC power supply in a partial switching pulse mode.
Figure 6:
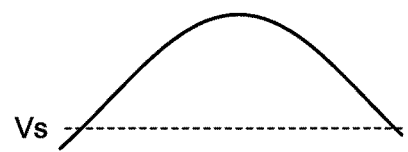
FIG. 6 is a diagram illustrating an operation when pulse conversion is not performed in a pulse conversion unit.
Figure 6:
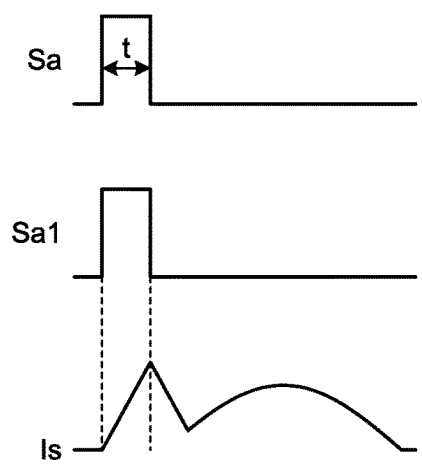
Figure 7:
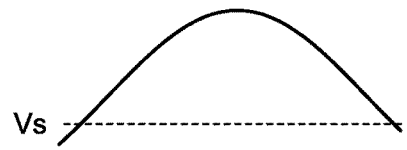
FIG. 7 is a diagram illustrating an operation when the pulse conversion is performed in the pulse conversion unit.
Figure 7:
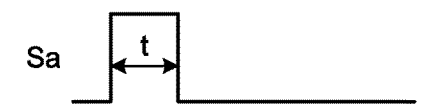
Figure 7:
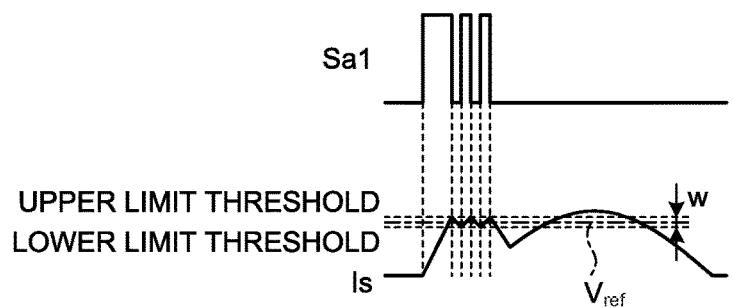
Figure 8:
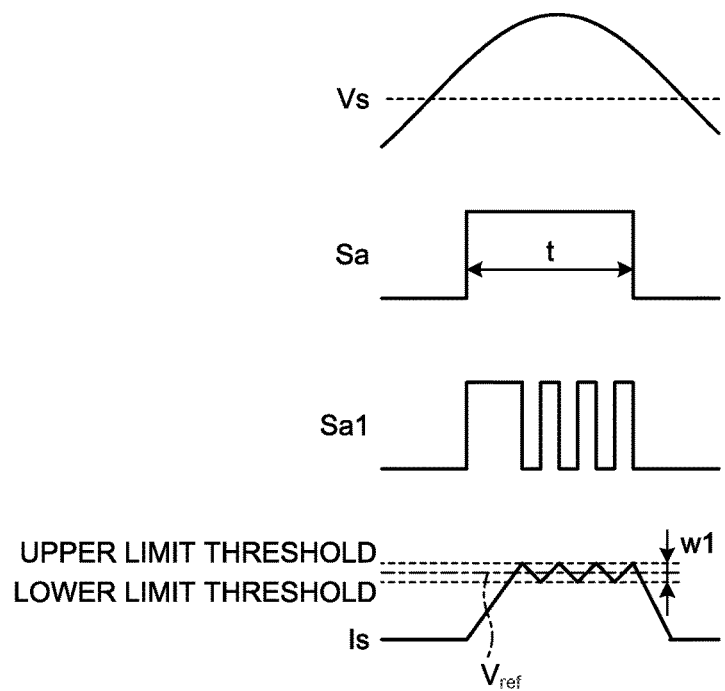
FIG. 8 is a diagram illustrating a state in which a current control range is widened.
Figure 9:
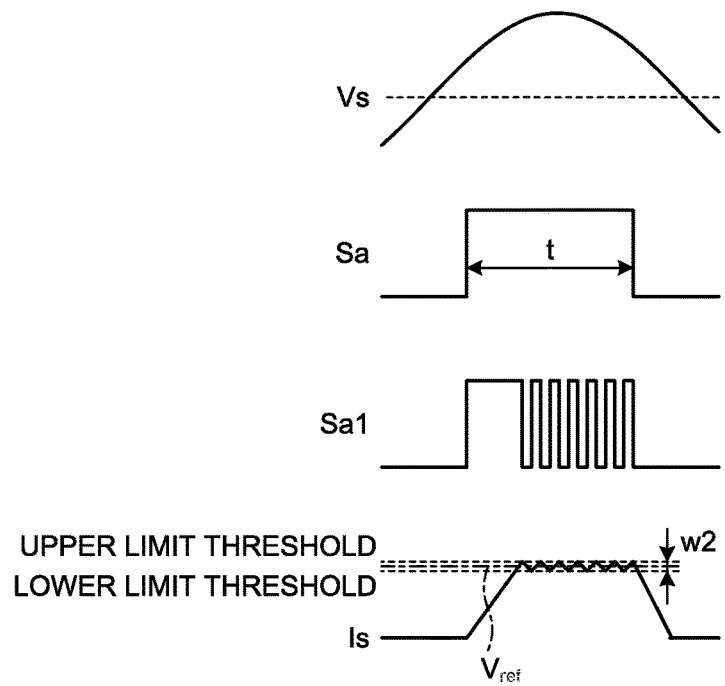
FIG. 9 is a diagram illustrating a state in which a current control range is narrowed.
Figure 10:
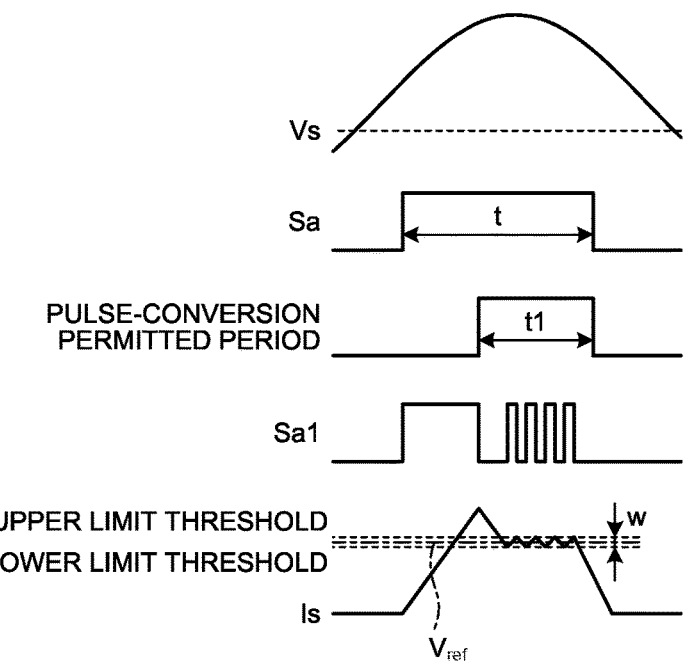
FIG. 10 is a diagram illustrating an operation when pulse conversion is performed in a period shorter than an on-period of a drive signal.
Figure 11:
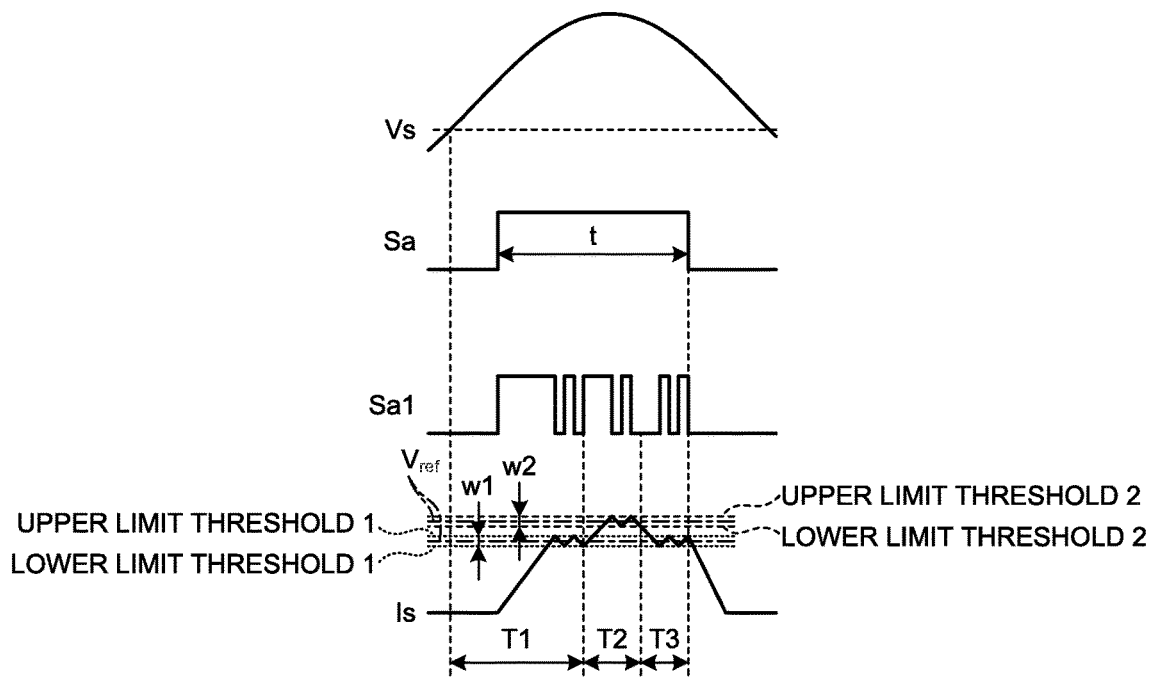
FIG. 11 is a diagram illustrating an operation when a reference voltage is varied in correspondence to a time elapsing from a zero crossing of a power-supply voltage.
Figure 12:
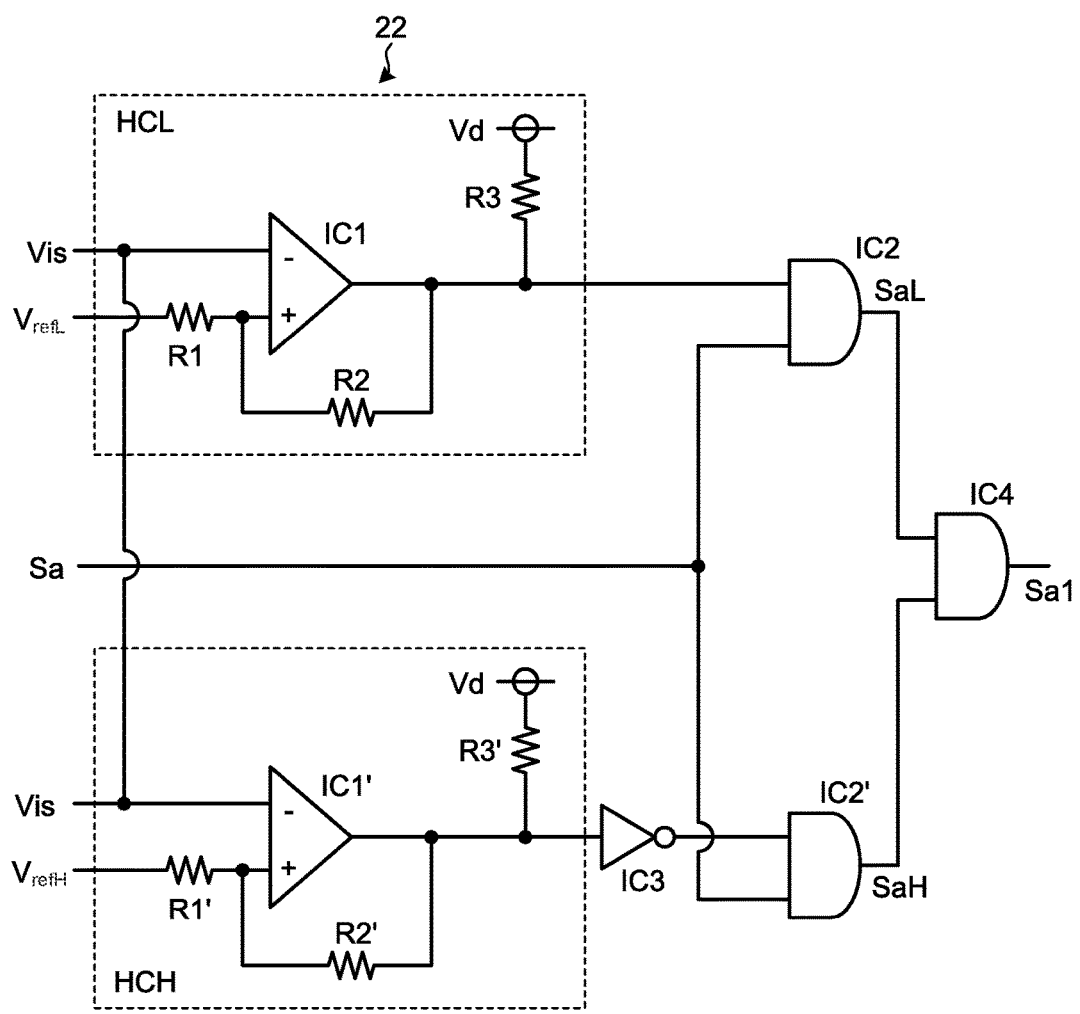
FIG. 12 is a diagram illustrating a configuration example of the pulse conversion unit.
Figure 13:
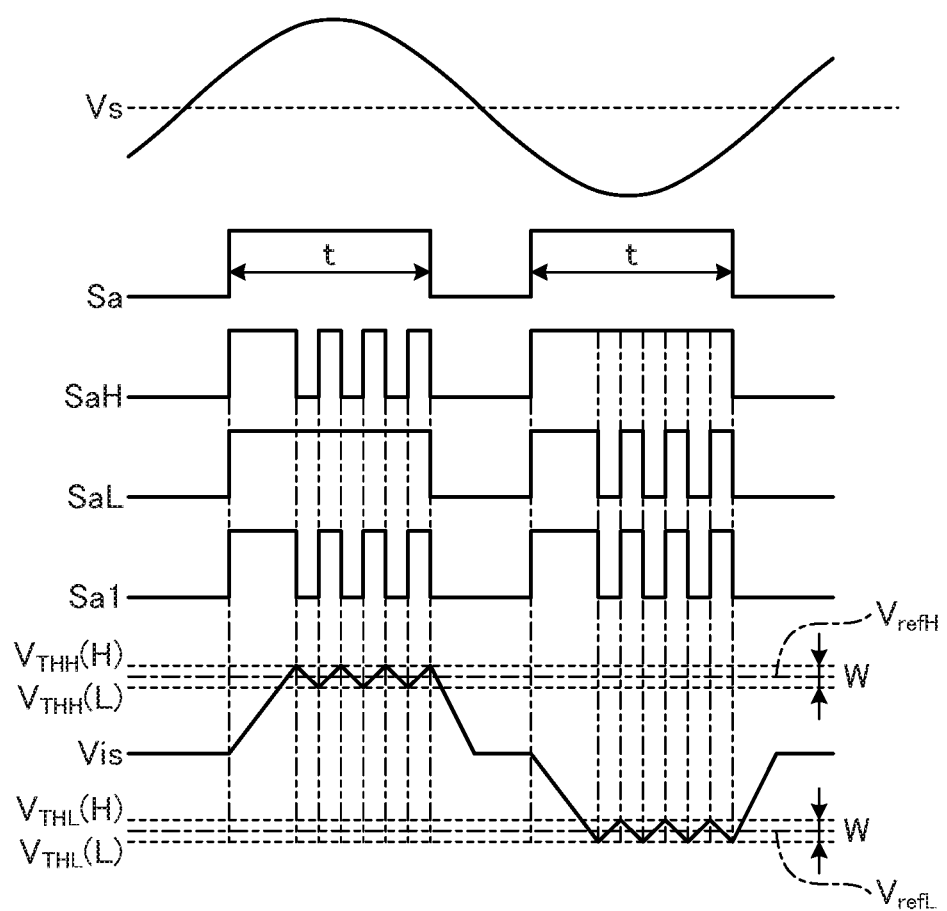
FIG. 13 is a diagram illustrating an operation when the pulse conversion unit illustrated in FIG. 12 is used.
Figure 14:
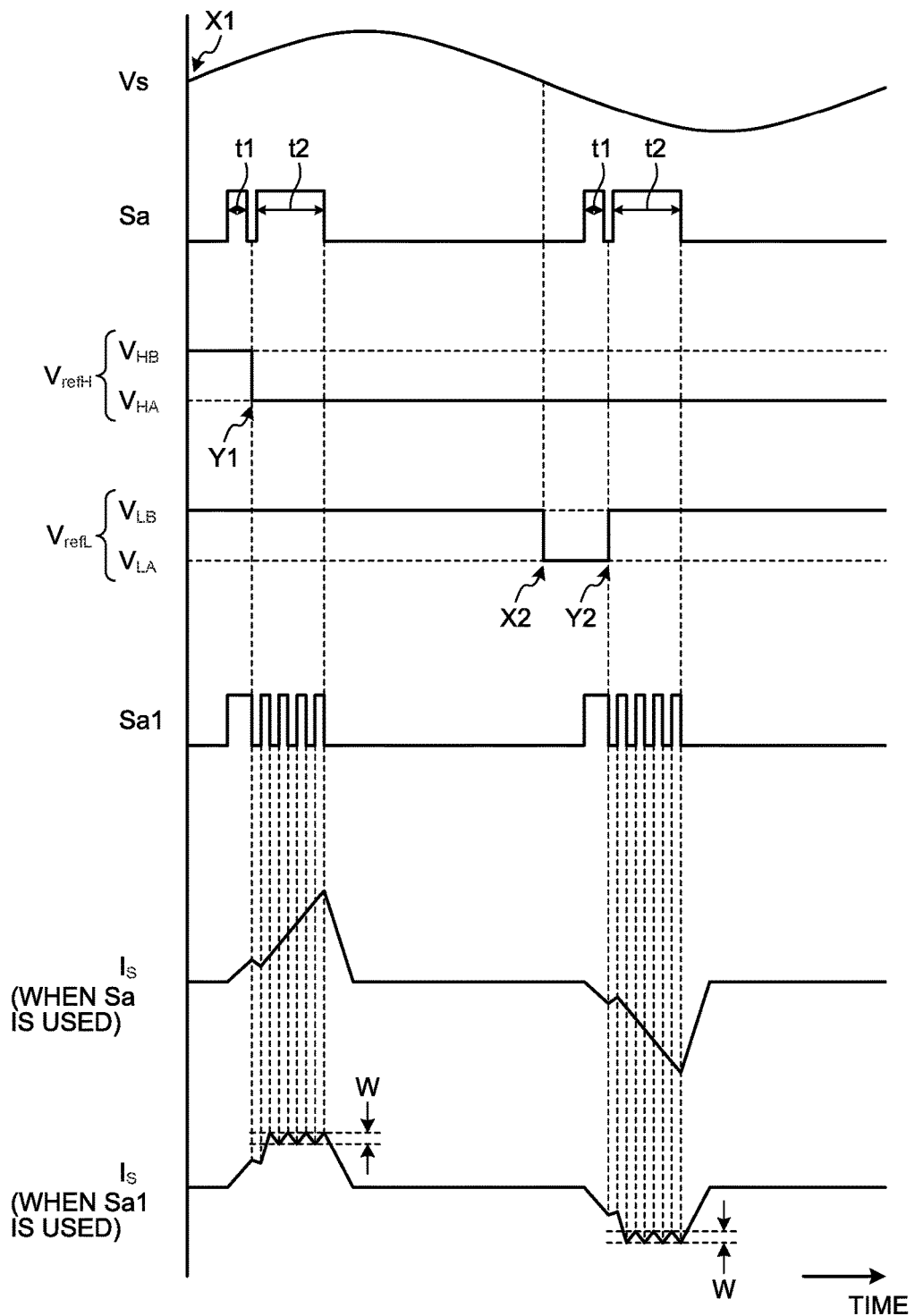
FIG. 14 is a diagram illustrating an operation when a drive signal is switched twice in a half cycle of a power-supply voltage.

FIG. 1 is a diagram illustrating a configuration example of a power conversion device 100 according to the first embodiment of the present invention. FIG. 2 is a first configuration diagram of a reference voltage generation circuit for pulse control. FIG. 3 is a second configuration diagram of a reference voltage generation circuit for pulse control. FIG. 4 is a diagram illustrating a simple circuit including a reactor 2, a short-circuit unit 30, a rectifier circuit 3, and a smoothing capacitor 4. FIG. 5 is a diagram illustrating a waveform of a power-supply current Is when a short-circuit element 32 is switched once in a half cycle on a positive side of an AC power supply 1 in a partial switching pulse mode. FIG. 6 is a diagram illustrating an operation when pulse conversion is not performed in a pulse conversion unit 22. FIG. 7 is a diagram illustrating an operation when the pulse conversion is performed in the pulse conversion unit 22. FIG. 8 is a diagram illustrating a state in which a current control range is widened. FIG. 9 is a diagram illustrating a state in which a current control range is narrowed. FIG. 10 is a diagram illustrating an operation when pulse conversion is performed in a period shorter than an on-period t of a drive signal Sa. FIG. 11 is a diagram illustrating an operation when a reference voltage $V_{ref}$ is varied in correspondence to a time elapsing from a zero crossing of a power-supply voltage Vs. FIG. 12 is a diagram illustrating a configuration example of the pulse conversion unit 22. FIG. 13 is a diagram illustrating an operation when the pulse conversion unit 22 illustrated in FIG. 12 is used. FIG. 14 is a diagram illustrating an operation when the drive signal Sa is switched twice in a half cycle of the power-supply voltage Vs.

The power conversion device 100 illustrated in FIG. 1 generates a DC voltage on the basis of an AC voltage supplied from the AC power supply 1 and supplies the DC voltage to a DC load 10 illustrated in FIG. 4. The power conversion device 100 includes the reactor 2, the rectifier circuit 3, the smoothing capacitor 4, a DC voltage detection unit 5, a power-supply voltage detection unit 6, a current detection unit 9, a control unit 20, a pulse transmission unit 24, and the short-circuit unit 30.

The reactor 2 is inserted between one input end of the rectifier circuit 3 and the AC power supply 1. The rectifier circuit 3 is connected to the AC power supply 1 via the reactor 2 and converts an AC voltage of the AC power supply 1 into a DC voltage. Although the rectifier circuit 3 of the illustrated example includes a diode bridge that is a combination of four diodes, the circuit 3 is not limited to this illustrated one. For example, the circuit 3 may be configured by a combination of metal oxide film semiconductor field effect transistors that are diode-connected unidirectional conduction elements.

Between output ends of the rectifier circuit 3, the smoothing capacitor 4 is connected. The smoothing capacitor 4 smooths a voltage of a full-wave rectification waveform that is output from the rectifier circuit 3. To both ends of the smoothing capacitor 4, the DC load 10 is connected in parallel.

The current detection unit 9 includes a current detection element 8 and a current detection unit 7. The current detection element 8 is connected between the reactor 2 and the rectifier circuit 3 and detects a current value at the connected position. For example, a current transformer or a shunt resistor is used as the current detection element 8. The current detection unit 7 is an amplifier or a level-shift circuit. The current detection unit 7 converts a voltage that is directly proportional to a current detected by the current detection element 8, into a current detection voltage Vis in a low voltage range that can be handled by the control unit 20, and outputs the current detection voltage Vis. The DC voltage detection unit 5 is an amplifier or a level-shift circuit. The DC voltage detection unit 5 detects a voltage across both ends of the smoothing capacitor 4, converts the detected voltage into a voltage detection value in a low voltage range that can be handled by the control unit 20, and outputs the voltage detection value.

A short-circuit unit 30 that is a bidirectional switch includes a diode bridge 31 that is connected to the AC power supply 1 in parallel via the reactor 2, and the short-circuit element 32 that is connected to both output ends of the diode bridge 31. Where the short-circuit element 32 is a metal oxide film semiconductor field effect transistor, a gate of the short-circuit element 32 is connected to the pulse transmission unit 24 and the short-circuit element 32 is turned on/off by a drive signal Sa2 that is a gate drive signal from the pulse transmission unit 24. When the short-circuit element 32 is turned on, the AC power supply 1 is short-circuited via the reactor 2 and the diode bridge 31.

The control unit 20, which includes a drive signal generation unit 21, the pulse conversion unit 22 and a reference voltage control unit 23, is configured by a microcomputer or a central processing unit.

On the basis of a value of a DC output voltage Vdc detected by the DC voltage detection unit 5 and a value of a power-supply voltage Vs detected by the power-supply voltage detection unit 6, the drive signal generation unit 21 generates drive signals Sa that are a plurality of switching pulses to control the short-circuit element 32 of the short-circuit unit 30.

Also, the drive signal generation unit 21 generates a hysteresis reference voltage that is a threshold value to limit a value of a power-supply current Is of the AC power supply 1. In the following description, the hysteresis reference voltage will be referred to as a reference voltage $V_{ref}$. The reference voltage $V_{ref}$ is a threshold value to limit a value of the power-supply current Is of the AC power supply 1. The reference voltages $V_{ref}$ generated in the drive signal generation unit 21 of the first embodiment are a reference voltage $V_{HA}$, a reference voltage $V_{HB}$, a reference voltage $V_{LA}$, and a reference voltage $V_{LB}$. The reference voltage $V_{HA}$ and the reference voltage $V_{HB}$ are positive-side reference voltages $V_{refH}$ and the reference voltage $V_{LA}$ and the reference voltage $V_{LB}$ are negative-side reference voltages $V_{refL}$. The reference voltage $V_{HB}$ is a reference voltage having a value higher than that of the reference voltage $V_{HA}$ and the reference voltage $V_{LB}$ is a reference voltage having a value higher than that of the reference voltage $V_{LA}$.

These reference voltages $V_{ref}$ are generated in a circuit illustrated in FIG. 2 or FIG. 3. For the circuit of FIG. 2, a pulse width modulation signal that is a port output Sb of the drive signal generation unit 21 is converted by a low pass filter into a DC value to thereby generate a reference voltage $V_{ref}$. In this case, it is possible to vary a value of the reference voltage $V_{ref}$ seamlessly by controlling a duty ratio of the pulse width modulation signal. The reference voltages $V_{ref}$ generated using this circuit become the reference voltage $V_{HA}$, the reference voltage $V_{HB}$, the reference voltage $V_{LA}$, and the reference voltage $V_{LB}$.

For the circuit of FIG. 3, a switch TR is driven by a port output Sb of the drive signal generation unit 21 to thereby stepwise vary a value of the reference voltage $V_{ref}$ with a division ratio of resistors Rb and Rc. The reference voltages $V_{ref}$ generated stepwise using this circuit become the reference voltage $V_{HA}$, the reference voltage $V_{HB}$, the reference voltage $V_{LA}$, and the reference voltage $V_{LB}$. It is noted that the circuit to generate the reference voltages $V_{ref}$ is not limited to these illustrated circuits. The reference voltages may be generated by a known circuit other than the circuit illustrated in FIG. 2 or FIG. 3 or reference voltages $V_{ref}$ generated outside the control unit 20 may be used.

The drive signals Sa, the power-supply voltage Vs detected by the power-supply voltage detection unit 6, and the reference voltage $V_{ref}$ from the drive signal generation unit 21 are input to the reference voltage control unit 23, and the reference voltage control unit 23 varies the reference voltage $V_{ref}$ stepwise in an on-section or an off-section of a plurality of the drive signals Sa detected in a half cycle of the power-supply voltage Vs. A detail of the reference voltage control unit 23 will be described later.

The pulse conversion unit 22 generates a switching pulse to keep a peak value of the power-supply current Is within a current control range w that is a target control range of the power-supply current Is of the AC power supply 1. More specifically, the current control range w includes its central value that is the reference voltage $V_{ref}$ from the drive signal generation unit 21, and upper and lower limit threshold values of the current control range w are set in the pulse conversion unit 22. Then, the pulse conversion unit 22 divides the drive signal Sa into a plurality of pulses in order that a peak value of a power-supply current Is, which is detected in an on-period t of the drive signal Sa, is kept between the upper limit threshold value and the lower limit threshold value. The divided drive signal Sa becomes drive signals Sa1. It is noted that the on-period t is a period from a time at which to turn on the drive signal Sa to a time at which to turn off the signal Sa. The upper limit threshold value is a threshold value to regulate an upper limit of a short-circuit current that flows when the short-circuit unit 30 is turned on and the lower limit threshold value is a threshold value that is set to be a value smaller than the upper limit threshold value. A pulse division operation by the pulse conversion unit 22 is performed at a positive level and a negative level of the AC power supply 1.

The pulse transmission unit 24 is configured by a level-shift circuit. The pulse transmission unit 24 performs voltage level shift to enable gate driving, converts the drive signal Sa1 into a drive signal Sa2, and outputs the drive signal Sa2. The drive signal Sa2 obtained in such a manner opens/closes the short-circuit unit 30.

Next, an operation of the power conversion device 100 of the first embodiment will be described. First, an operation of the device 100 when the pulse conversion unit 22 does not perform pulse conversion will be described. It is noted that turning on/off the short-circuit unit 30 once or a plurality of times in a half cycle of a power supply in current open-loop control will be referred to as a partial switching pulse mode.

FIG. 4 illustrates a current path when the short-circuit unit 30 is turned on/off. When the short-circuit unit 30 is turned on, a closed circuit is formed by the AC power supply 1, the reactor 2 and the short-circuit unit 30, and the AC power supply 1 is short-circuited via the reactor 2. Thus, the power-supply current Is flows in the closed circuit and the magnetic energy calculated from $(½) \times LI^2$ is accumulated in the reactor 2.

At the same time the short-circuit unit 30 is turned off, the accumulated energy is discharged to the DC-load 10 side, rectified in the rectifier circuit 3, and transferred to the smoothing capacitor 4. This series of operations allows the flow of a power-supply current Is as illustrated in FIG. 5. Thus, it is possible to widen an energization angle of the power-supply current Is, as compared to a passive mode that provides no improvement in a power factor, and hence improve a power factor.

For the partial switching pulse mode, a short-circuiting start time and a continuous short-circuiting time in the short-circuit unit 30 are controlled to thereby control energy that is to be accumulated in the reactor 2, such that a DC output voltage Vdc can be boosted in a stepless manner. FIG. 5 illustrates a drive signal Sa1 that is a single pulse for switching the short-circuit unit 30 once in a half cycle of a power supply, which is one example of an operation in the partial switching pulse mode. It will be appreciated that the short-circuit unit 30 may be switched twice or more in the half cycle of the power supply.

Next, a waveform of a power-supply current Is when the pulse conversion unit 22 is not operated and a waveform of a power-supply current Is when the pulse conversion unit 22 is operated are compared and described.

FIG. 6 illustrates a waveform of the power-supply current Is when a drive signal Sa that is a single pulse from the drive signal generation unit 21 is not converted into a plurality of pulses. When the pulse conversion is not performed by the pulse conversion unit 22, a drive signal Sa1 is turned on at a timing at which the drive signal Sa is turned on. During an on-period t of the drive signal Sa, the drive signal Sa1 remains in the on state in a period equal to the on-period t of the drive signal Sa. Thus, the short-circuiting time of the short-circuit element 32 becomes long in direct proportion to the on-period t of the drive signal Sa when the power-supply voltage Vs is boosted, such that the power-supply current Is is increased, as illustrated. Then, when the power-supply current Is reaches a set value, the drive signal Sa is turned off, and the drive signal Sa1 is turned off at the timing at which the drive signal Sa is turned off.

When the short-circuiting time of the short-circuit element 32 is extended as discussed above, a peak of the power-supply current Is becomes high although more energy can be accumulated in the reactor 2. As a result, problems such as a decrease in a power factor, an increase of a harmonic component, and an increase of a circuit loss occur.

FIG. 7 illustrates a waveform of the power-supply current Is when a drive signal Sa that is a single pulse from the drive signal generation unit 21 is converted into a plurality of pulses. When the pulse conversion is performed in the pulse conversion unit 22, a drive signal Sa1 is turned on and the power-supply current Is is increased at the timing at which the drive signal Sa is turned on. A current detection voltage Vis output from the current detection unit 7, that is, a current detection value detected by the current detection unit 7 is increased as the power-supply current Is is increased. Then, when the current detection value exceeds the upper limit threshold value in the period during which the drive signal Sa is in the on state, the pulse conversion unit 22 turns off the drive signal Sa1.

As a result, the power-supply current Is is decreased and thus the current detection value is reduced. Then, when the current detection value becomes smaller than the lower limit threshold value in the period during which the drive signal Sa is in the on state, the pulse conversion unit 22 turns on the drive signal Sa1 again. As a result, the power-supply current Is is increased again and thus the current detection value detected by the current detection unit 7 rises.

Turning on and off the drive signal Sa1 repeatedly in the on-period t of the drive signal Sa in the manner as stated above controls a peak value of the power-supply current Is in the on-period t of the drive signal Sa to be within the current control range w. Thus, even when the DC output voltage Vdc is boosted to a relatively large value, a peak value of the power-supply current Is in the on-period t of the drive signal Sa illustrated in FIG. 7 is kept smaller than a peak value when the drive signal Sa1 is turned off.

Adjusting the upper limit threshold value and the lower limit threshold value, as illustrated in FIG. 8 and FIG. 9, controls the number of times the drive signal Sa1 is switched in the on-period t of the above-described drive signal Sa, thereby changing a waveform of the power-supply current Is. A current control range w1 illustrated in FIG. 8 is set to be wider than a current control range w2 illustrated in FIG. 9. Adjusting the upper limit threshold and the lower limit threshold in this manner achieves performance corresponding to the reactor 2, the DC load 10, and a harmonic standard.

Although the example in which the pulse-conversion permitted period equal to the on-period t of the drive signal Sa is set has been described, the pulse-conversion permitted period is not necessarily equal to the on-period t of the drive signal Sa. As illustrated in FIG. 10, a time shorter than the on-period t of the drive signal Sa may be set as a pulse-conversion permitted period t1.

According to the example in FIG. 10, a drive signal Sa1 is turned on at a timing at which a drive signal Sa is turned on. Accordingly, a power-supply current Is is increased. Even when a current detection value exceeds an upper limit threshold value at a time point before the pulse-conversion permitted period t1, pulse conversion is not performed in the pulse conversion unit 22. When a pulse indicating a start of the pulse-conversion permitted period t1 becomes an on state, the drive signal Sa1 becomes an off state and thus the power-supply current Is is decreased. Then, when a current detection value becomes smaller than a lower limit threshold value in the pulse-conversion permitted period t1, the drive signal Sa1 is turned on in the pulse conversion unit 22 and thus the power-supply current Is is increased. Then, when the current detection value exceeds the upper limit threshold value in the pulse-conversion permitted period t1, the drive signal Sa1 is turned off in the pulse conversion unit 22 and thus the power-supply current Is is decreased again.

Even when the pulse-conversion permitted period t1 shorter than the on-period t of the drive signal Sa is set, a peak value of the power-supply current Is in the pulse-conversion permitted period t1 is controlled to be within the current control range w. As a result, as compared to a pulse-conversion permitted period set to be equal to the on-period t of the drive signal Sa, the number of times the drive signal Sa1 is switched is decreased to reduce loss of the elements and thus a temperature increase and a noise.

Although the above description has been made as to a configuration example in which the reference voltage $V_{ref}$ is a constant value in a half cycle of the power supply, the upper limit threshold value and the lower limit threshold value are not necessarily constant values. As illustrated in FIG. 11, a reference voltage $V_{ref}$ may be varied in correspondence to a time elapsing from a zero crossing of a power-supply voltage Vs.

According to the configuration example in FIG. 11, a drive signal Sa1 is turned on at a timing at which a drive signal Sa is turned on. Accordingly, a power-supply current Is is increased. Then, the pulse conversion unit 22 performs pulse conversion according to an upper limit threshold value 1 and a lower limit threshold value 1 until a certain time T1 elapses from the time point of the zero crossing. The lower limit threshold value 1 is a threshold value lower than the upper limit threshold value 1. As a result, during the certain time T1, a peak value of the power-supply current Is is controlled to be within a current control range w1.

Until a certain time T2 elapses from a time point at which the certain time T1 has elapsed, pulse conversion is performed according to upper and lower limit threshold values 2, 2 with a reference voltage $V_{ref}$ centered therebetween and higher than a reference voltage $V_{ref}$ of the current control range w1. The upper limit threshold value 2 is a threshold value higher than the upper limit threshold value 1, and the lower limit threshold value 2 is a threshold value lower than the upper limit threshold value 2 and is higher than the upper limit threshold value 1. As a result, during the certain time T2, a peak value of the power-supply current Is is controlled to be within a current control range w2.

During a period T3 from a time point, at which the certain time T2 has elapsed, to a time point at which the drive signal Sa is turned off, pulse conversion is performed according to the upper and lower limit threshold values 1, 1 identical to the upper and lower limit threshold values that are set during the time from the time point of the zero crossing to the time point at which the certain time T1 has elapsed. As a result, during the certain period T3, a peak value of the power-supply current Is is controlled to be within the current control range w1.

With such a configuration, in a case where many harmonic components of a specific degree are generated with respect to a harmonic regulation value, it is possible to decrease the magnitude thereof.

Next, a configuration example of the pulse conversion unit 22 will be described. The pulse conversion unit 22 illustrated in FIG. 12 is configured by a positive-side hysteresis comparator HCH, a negative-side hysteresis comparator HCL, and a plurality of logic ICs.

To the positive-side hysteresis comparator HCH, the current detection voltage Vis that is an output from the current detection unit 7 and the positive-side reference voltage $V_{refH}$ from the drive signal generation unit 21 are input. To the negative-side hysteresis comparator HCL, the current detection voltage Vis and the negative-side reference voltage $V_{refL}$ from the drive signal generation unit 21 are input.

The current detection unit 7 illustrated in FIG. 1 includes a level-shift circuit or an amplifier that are provided in an output stage of the current detection element 8. With ½ Vd, that is, a value half of a low voltage system power supply Vd as 0 ampere, the current detection unit 7 converts a waveform of an AC current detected by the current detection element 8 into the current detection voltage Vis, which is a voltage signal, and outputs the current detection voltage Vis. Accordingly, the pulse conversion unit 22 in FIG. 12 can generate the drive signal Sa1 regardless of a current polarity.

Next, an operation of the pulse conversion unit 22 illustrated in FIG. 12 will be described with reference to FIG. 13.

In the positive electrode-side hysteresis comparator HCH, a hysteresis Δ corresponding to a current control range w on the positive side is determined by a relationship between a positive-side upper limit threshold value $V_{THH}$ (H) calculated by an expression (1), a positive-side lower limit threshold value $V_{THH}$ (L) calculated by an expression (2), and the positive-side reference voltage $V_{refH}$. Also, an output from the positive-side hysteresis comparator HCH is inverted by a NOT logic IC 3. An AND logic IC 2' calculates AND of an output from the NOT logic IC 3 and a drive signal Sa, thereby outputting a positive-side drive signal SaH. It is noted that $V_d$ in the expression (1) indicates a low voltage system power supply and $V_{OL}$ in the expression (2) indicates an output saturation voltage of an operational amplifier.

[Math 1]

$$V_{THH}(H) = V_{refH} + \frac{R_1}{R_1 + R_2 + R_3}(V_d - V_{refH}) \quad (1)$$

[Math 2]

$$V_{THH}(L) = V_{refH} + \frac{R_1}{R_1 + R_2 + R_3}(V_{refH} - V_{OL}) \quad (2)$$

Similarly, in the negative-side hysteresis comparator HCL, a negative-side upper limit threshold value $V_{THL}$ (H) is calculated by the expression (1) and a negative-side lower limit threshold value $V_{THL}$ (L) is calculated by an expression (2).

A hysteresis Δ corresponding to a current control range w on the negative side is determined by a relationship between the negative-side upper limit threshold value $V_{THL}$ (H), the negative-side lower limit threshold value $V_{THL}$ (L), and the negative-side reference voltage $V_{refL}$. In an AND logic IC 2, an AND logic of an output from the negative-side hysteresis comparator HCL and a drive signal Sa is calculated to output a negative-side drive signal SaL. Then, in an AND logic IC 4, an AND logic of the positive-side drive signal SaH and the negative-side drive signal SaL is calculated to output a drive signal Sa1 that is a result of the AND logic.

By using the pulse conversion unit 22 including the plurality of hysteresis comparators as illustrated in FIG. 12, it becomes possible to generate the drive signal Sa1 regardless of the current polarity. Thus, it is possible to control the power-supply current Is, that is, the waveform of the current detection voltage Vis in FIG. 13. Thus, it becomes possible to boost the DC output voltage Vdc while controlling a peak value of a short-circuit current that flows when the short-circuit unit 30 is in the on state.

Also, each of the hysteresis comparators in FIG. 12 can change a width of the hysteresis A by changing resistor values of resistors R1, R2, and R3. For example, when a series circuit of a switch and a resistor is connected in parallel to the resistor R2 or a resistor R2' and the switch is switched, it is possible to switch a combined resistance value.

Next, an operation when the drive signal Sa is switched twice in the half cycle of the power-supply voltage Vs will be described.

FIG. 14 illustrates how a reference voltage, a drive signal Sa1, and a power-supply current Is change when the drive signal Sa is switched twice in the half cycle of the power-supply voltage Vs. The two drive signals Sa when a power-supply voltage Vs is positive are a first drive signal Sa having an on-period t1 from a time at which the first drive signal Sa is turned on to a time at which to the first drive signal Sa is turned off, and a second drive signal Sa having an on-period t2 from a time at which the second drive signal Sa is turned on to a time at which the second drive signal Sa is turned off. On-periods t1 and t2 of two drive signals Sa detected by the reference voltage control unit 23 when the power-supply voltage Vs is negative are the same as those of the drive signals when the voltage Vs is positive.

X1 indicates a power-supply zero crossing point when the power-supply voltage Vs changes from the negative voltage to the positive voltage. Y1 indicates a time point at which a certain time has elapsed from a time point at which a falling edge of the first drive signal Sa detected when the power-supply voltage Vs is the positive voltage is detected. X2 indicates a power-supply zero crossing point when the power-supply voltage Vs changes from the positive voltage to the negative voltage. Y2 indicates a time point at which a certain time has elapsed from a time point at which a falling edge of the first drive signal Sa detected when the power-supply voltage Vs is the negative voltage is detected.

An operation when the reference voltage control unit 23 determines that the power-supply voltage Vs is the positive voltage will be described. When determining that the power-supply voltage Vs is the positive voltage, the reference voltage control unit 23 selects the reference voltage $V_{HB}$ until the time point of Y1 and selects the reference voltage $V_{HA}$ at the time point of Y1. That is, when the power-supply voltage Vs is the positive voltage, the reference voltage control unit 23 maintains the positive-side reference voltage $V_{refH}$ at a high value until the falling edge of the first drive signal Sa is detected. Also, the reference voltage control unit 23 changes a value of the positive-side reference voltage $V_{refH}$ to decrease in an off-section between the first drive signal Sa and the second drive signal Sa.

The pulse conversion unit 22 controls the number of times the drive signal Sa1 is switched, in correspondence to the positive-side reference voltage $V_{refH}$ changed by the reference voltage control unit 23. Thus, the drive signal Sa1 when the reference voltage $V_{HB}$ is selected remains in the on state for a period equal to the on-period t1 of the first drive signal Sa.

On the other hand, a drive signal Sa1 after the reference voltage $V_{HA}$ is selected has a waveform of a plurality of shapes into which the second drive signal Sa when the power-supply voltage Vs is the positive voltage is divided. More specifically, in the off-section between the first drive signal Sa and the second drive signal Sa, when the positive-side reference voltage $V_{refH}$ changes to decrease, the second drive signal Sa is divided into a plurality of switching pulses. The plurality of divided switching pulses, that is, a plurality of drive signals Sa1 is output to the pulse transmission unit 24.

Since a value of the power-supply current Is is small in the period from X1 to Y1, when the reference voltage control unit 23 selects the reference voltage $V_{HB}$ having a value larger than that of the reference voltage $V_{HA}$, it is possible to spuriously turn off an operation of limiting a value of the power-supply current Is. Also, when the reference voltage control unit 23 selects the reference voltage $V_{HA}$ at the time point of Y1, it is possible to keep the peak value of the power-supply current Is within a current control range w having its central value that is the reference voltage $V_{HA}$.

When the power-supply voltage Vs is the negative voltage, the pulse division operation using the positive-side reference voltage $V_{refH}$ is not performed in the pulse conversion unit 22. Thus, a timing at which the reference voltage $V_{HA}$ is switched to the reference voltage $V_{HB}$ after the reference voltage $V_{HA}$ is selected when the power-supply voltage Vs is the positive voltage may be a power-supply zero crossing point after a lapse of one cycle from the timing of X1 or may be a timing after a lapse of one cycle from a timing at which the first drive signal Sa rises when the power-supply voltage is the positive voltage.

Next, an operation when the reference voltage control unit 23 determines that the power-supply voltage Vs is the negative voltage will be described. When determining that the power-supply voltage Vs is the negative voltage, the reference voltage control unit 23 selects the reference voltage $V_{LA}$ in a period from X2 to Y2 and selects the reference voltage $V_{LB}$ at a time point of Y2. That is, when the power-supply voltage Vs is the negative voltage, the reference voltage control unit 23 maintains the negative-side reference voltage $V_{refL}$ at a low value until the falling edge of the first drive signal Sa is detected. Also, the reference voltage control unit 23 changes a value of the negative-side reference voltage $V_{refL}$ to increase in an off-section between the first drive signal Sa and the second drive signal Sa.

The pulse conversion unit 22 controls the number of times the drive signal Sa1 is switched, in correspondence to the negative-side reference voltage $V_{refL}$ controlled by the reference voltage control unit 23. Thus, the drive signal Sa1 when the reference voltage $V_{LA}$ is selected remains in the on state for a period equal to the on-period t1 of the first drive signal Sa.

On the other hand, a drive signal Sa1 after the reference voltage $V_{LB}$ is selected has a waveform of a plurality of shapes into which the second drive signal Sa detected when the power-supply voltage Vs is the negative voltage is divided. More specifically, when the negative-side reference voltage $V_{refL}$ changes to increase in the off-section between the first drive signal Sa and the second drive signal Sa, the second drive signal Sa is divided into a plurality of switching pulses, that is, a plurality of drive signals Sa1. The plurality of divided drive signals Sa1 is output to the pulse transmission unit 24.

Since an absolute value of a power-supply current Is is small in the period from X2 to Y2, when the reference voltage control unit 23 selects the reference voltage $V_{LA}$ having a value smaller than that of the reference voltage $V_{LB}$, it is possible to spuriously turn off an operation of limiting a value of the power-supply current Is. Also, when the reference voltage control unit 23 selects the reference voltage $V_{LB}$ at the time point of Y2, it is possible to keep the peak value of the power-supply current Is within a current control range w having its central value that is the reference voltage $V_{LB}$.

When the power-supply voltage Vs is the positive voltage, the pulse division operation using the negative-side reference voltage $V_{refL}$ is not performed in the pulse conversion unit 22. Thus, a timing at which the reference voltage $V_{LB}$ is switched to the reference voltage $V_{LA}$ after the reference voltage $V_{LB}$ is selected when the power-supply voltage Vs is the negative voltage may be a power-supply zero crossing point after a lapse of one cycle from the timing of X2 or may be a timing after a lapse of one cycle from a timing at which the first drive signal Sa rises when the power-supply voltage is the negative voltage.

Second Embodiment.

Figure 15:
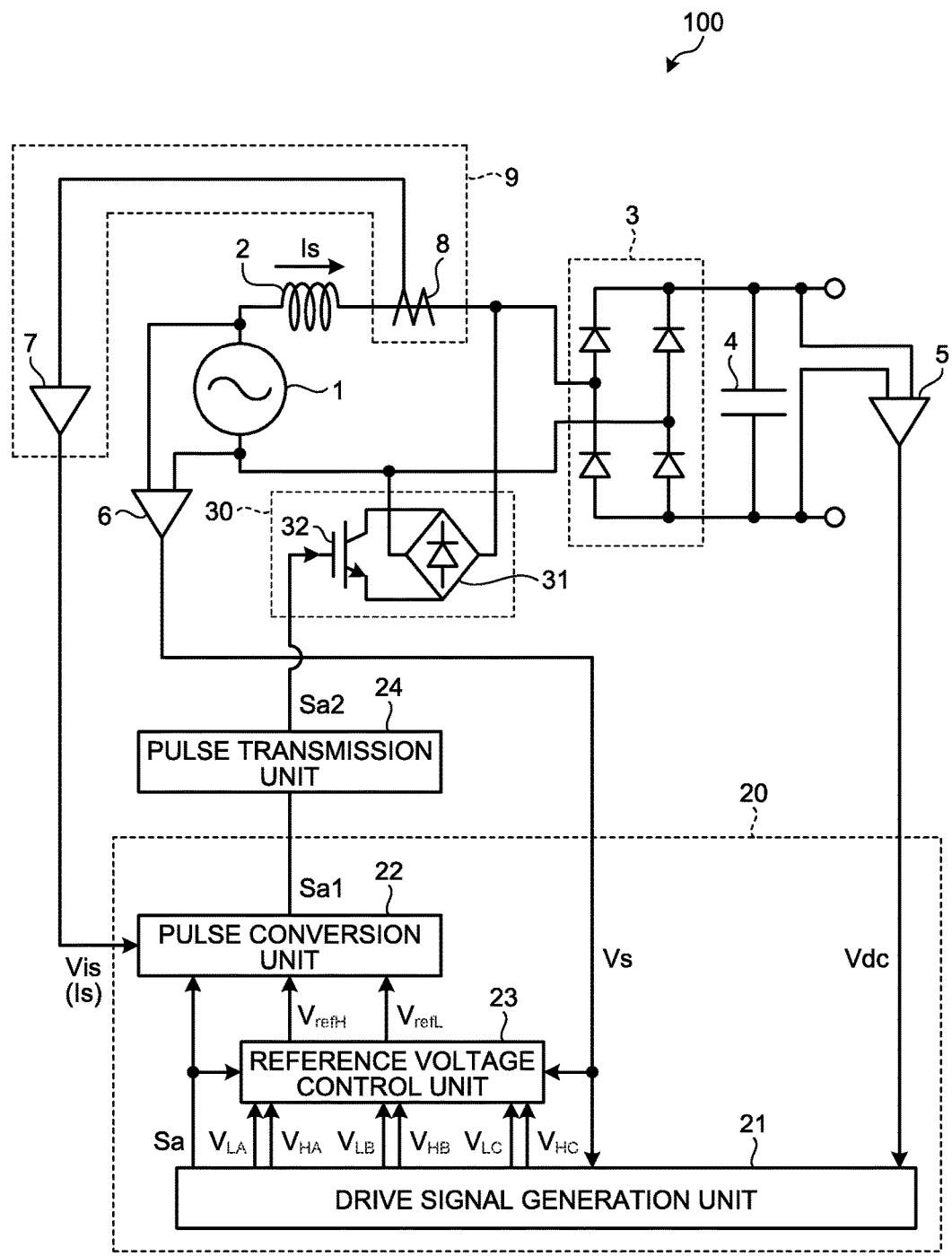
FIG. 15 is a diagram illustrating a configuration example of a power conversion device according to a second embodiment of the present invention.
Figure 16:
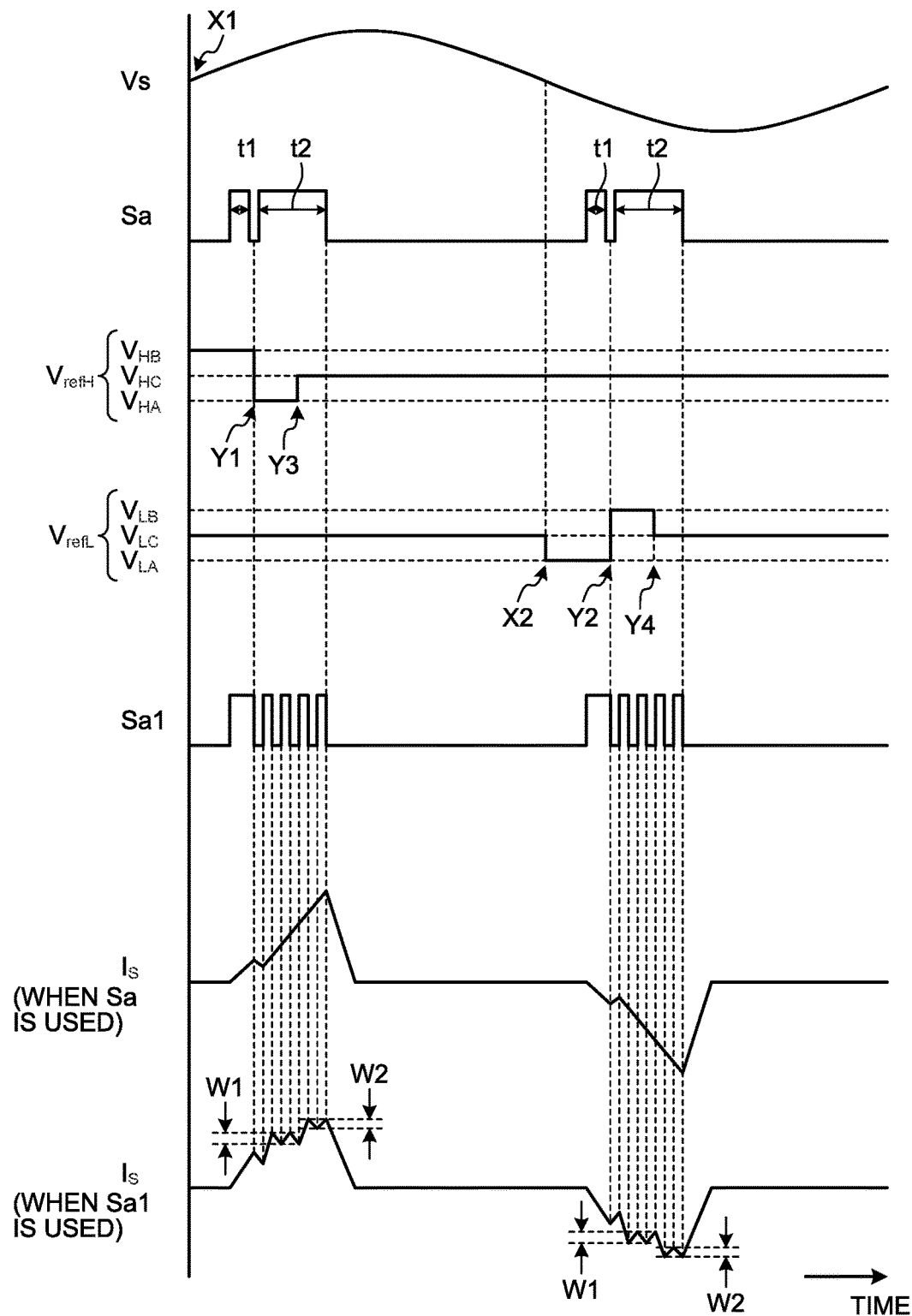
FIG. 16 is a diagram illustrating an operation of the power conversion device according to the second embodiment of the present invention.

FIG. 15 is a diagram illustrating a configuration example of a power conversion device 100 according to a second embodiment of the present invention. FIG. 16 is a diagram illustrating an operation of the power conversion device 100 according to the second embodiment of the present invention. The second embodiment differs from the first embodiment in that three reference voltages of different values that are positive-side reference voltages $V_{refH}$, and three reference voltages of different values that are negative-side reference voltages $V_{refL}$ are used. An identical sign is assigned to a part identical to that of the first embodiment and the description thereof is omitted. A description of the second embodiment is made hereinafter as to only those different respects.

Reference voltages $V_{ref}$ generated in the drive signal generation unit 21 of the second embodiment are a reference voltage $V_{HA}$, a reference voltage $V_{HB}$, a reference voltage $V_{HC}$, a reference voltage $V_{LA}$, a reference voltage $V_{LB}$, and a reference voltage $V_{LC}$.

The reference voltage $V_{HA}$, the reference voltage $V_{HB}$, and the reference voltage $V_{HC}$ are positive-side reference voltages $V_{refH}$ while the reference voltage $V_{LA}$, the reference voltage $V_{LB}$, and the reference voltage $V_{LC}$ are negative-side reference voltages $V_{refL}$. The reference voltage $V_{HC}$ is a reference voltage having a value larger than that of the reference voltage $V_{HA}$ and smaller than that of the reference voltage $V_{HB}$ while the reference voltage $V_{LC}$ is a reference voltage having a value larger than that of the reference voltage $V_{LA}$ and smaller than that of the reference voltage $V_{LB}$. These reference voltages $V_{ref}$ are generated in the circuit illustrated in FIG. 2 or FIG. 3.

Next, an operation when a drive signal Sa is switched twice in the half cycle of the power-supply voltage Vs will be described.

The signs X1, X2, Y1, and Y2 assigned in FIG. 16 are those as described in the first embodiment. Y3 indicates a time point from a time point of Y1 to a time point until the second on-period t2 detected when the power-supply voltage Vs is the positive voltage elapses. Y4 indicates a time point from a time point of Y2 to a time point until the second on-period t2 detected when the power-supply voltage Vs is the negative voltage elapses.

An operation when a reference voltage control unit 23 determines that the power-supply voltage Vs is the positive voltage will be described. When determining that the power-supply voltage Vs is the positive voltage, the reference voltage control unit 23 selects the reference voltage $V_{HB}$ until the time point of Y1, selects the reference voltage $V_{HA}$ at the time point of Y1, and selects the reference voltage $V_{HC}$ at the time point of Y3. That is, when the power-supply voltage Vs is the positive voltage, the reference voltage control unit 23 maintains the positive-side reference voltage $V_{refH}$ at a high value until the falling edge of the first drive signal Sa is detected. Also, the reference voltage control unit 23 changes a value of the positive-side reference voltage $V_{refH}$ to decrease in an off-section between the first drive signal Sa and the second drive signal Sa. Moreover, the reference voltage control unit 23 changes a value of the positive electrode-side reference voltage $V_{refH}$ to increase in the second on-period t2, that is, an on-section of the drive signal Sa.

The pulse conversion unit 22 controls the number of times the drive signal Sa1 is switched, in correspondence to the positive-side reference voltage $V_{refH}$ controlled by the reference voltage control unit 23. Thus, a drive signal Sa1 when the reference voltage $V_{HB}$ is selected remains in the on state for a period equal to the on-period t1 of the first drive signal Sa.

On the other hand, the drive signal Sa1 after the reference voltages $V_{HA}$ and $V_{HC}$ are selected has a waveform of a plurality of shapes into which the second drive signal Sa detected when the power-supply voltage Vs is the positive voltage is divided. In FIG. 16, a width of the drive signal Sa1 when the reference voltage $V_{HC}$ is selected is wider than a width of the drive signal Sa1 when the reference voltage $V_{HA}$ is selected.

Since a value of a power-supply current Is is small in a period from X1 to Y1, when the reference voltage control unit 23 selects the reference voltage $V_{HB}$ having a value larger than that of the reference voltage $V_{HA}$, it is possible to spuriously turn off an operation of limiting a value of the power-supply current Is. Also, when the reference voltage control unit 23 selects the reference voltage $V_{HA}$ at the time point of Y1, it is possible to keep the peak value of the power-supply current Is within a current control range w1 having its central value that is the reference voltage $V_{HA}$. Moreover, when the reference voltage control unit 23 selects the reference voltage $V_{HC}$ at the time point of Y3, it is possible to keep the peak value of the power-supply current Is within a current control range w2 having values larger than those of the current control range w1. That is, it is possible to keep the peak value of the power-supply current Is within the current control range w2 having its central value that is the reference voltage $V_{HC}$. As a result, the power-supply current Is having its waveform close to a sine wave is obtained and hence a power-supply current Is near a peak value of the positive power-supply voltage Vs easily flows.

When the power-supply voltage Vs is the negative voltage, the pulse division operation using the positive-side reference voltage $V_{refH}$ is not performed in the pulse conversion unit 22. Thus, a timing at which the reference voltage $V_{HC}$ is switched to the reference voltage $V_{HB}$ after the reference voltage $V_{HC}$ is selected when the power-supply voltage Vs is the positive voltage may be a power-supply zero crossing point after a lapse of one cycle from the timing of X1 or may be a timing after a lapse of one cycle from a timing at which the first drive signal Sa rises when the power-supply voltage is the positive voltage.

Next, an operation when the reference voltage control unit 23 determines that the power-supply voltage Vs is the negative voltage will be described. When determining that the power-supply voltage Vs is the negative voltage, the reference voltage control unit 23 selects the reference voltage $V_{LA}$ until the time point of Y2 and selects the reference voltage $V_{LB}$ at the time point of Y2. Moreover, the reference voltage control unit 23 selects the reference voltage $V_{LC}$ at the time point of Y4. That is, when the power-supply voltage Vs is the negative voltage, the reference voltage control unit 23 maintains the negative-side reference voltage $V_{refL}$ at a low value until the falling edge of the first drive signal Sa is detected. Also, the reference voltage control unit 23 changes a value of the negative-side reference voltage $V_{refL}$ to increase in an off-section between the first drive signal Sa and the second drive signal Sa. Moreover, the reference voltage control unit 23 changes a value of the negative-side reference voltage $V_{refL}$ to decrease in a second on-period t2, that is, an on-section of the drive signal Sa.

The pulse conversion unit 22 controls the number of times the drive signal Sa1 is switched, in correspondence to the negative-side reference voltage $V_{refL}$ controlled by the reference voltage control unit 23. Thus, the drive signal Sa1 when the reference voltage $V_{LA}$ is selected remains in the on state for a period equal to the on-period t1 of the first drive signal Sa.

On the other hand, the drive signal Sa1 after the reference voltages $V_{LB}$ and $V_{LC}$ are selected has a waveform of a plurality of shapes into which the second drive signal Sa detected when the power-supply voltage Vs is the negative voltage is divided. In FIG. 16, a width of the drive signal Sa1 when the reference voltage $V_{LC}$ is selected is wider than a width of the drive signal Sa1 when the reference voltage $V_{LB}$ is selected.

Since an absolute value of a power-supply current Is is small in a period from X2 to Y2, when the reference voltage control unit 23 selects the reference voltage $V_{LB}$ having a value larger than that of the reference voltage $V_{LA}$, it is possible to spuriously turn off an operation of limiting a value of the power-supply current Is. Also, when the reference voltage control unit 23 selects the reference voltage $V_{LB}$ at the time point of Y2, it is possible to keep the peak value of the power-supply current Is within a current control range w1 having its central value that is the reference voltage $V_{LB}$. Moreover, when the reference voltage control unit 23 selects the reference voltage $V_{LC}$ at the time point of Y4, it is possible to keep the peak value of the power-supply current Is within a current control range w2 having an absolute value larger than that of the current control range w1. That is, it is possible to keep the peak value of the power-supply current Is within the current control range w2 having its central value that is the reference voltage $V_{LC}$. As a result, the power-supply current Is closer to a sine wave is obtained and hence the power-supply current Is near a peak value of the negative power-supply voltage Vs easily flows.

When the power-supply voltage Vs is the positive voltage, the pulse division operation using the negative-side reference voltage $V_{refL}$ is not performed in the pulse conversion unit 22. Thus, a timing at which the reference voltage $V_{LC}$ is switched to the reference voltage $V_{LA}$ after the reference voltage $V_{LC}$ is selected when the power-supply voltage Vs is the negative voltage may be a power-supply zero crossing point after a lapse of one cycle from the timing of X2 or may be a timing after a lapse of one cycle from a timing at which the first drive signal Sa rises when the power-supply voltage is the negative voltage.

According to the power conversion device 100 of the second embodiment, it is possible to obtain the power-supply current Is having its waveform closer to the sine wave. Thus, the power-supply current Is near the peak value of the positive or negative power-supply voltage Vs easily flows. Although, in the second embodiment, the number of the variable reference voltages $V_{ref}$ is three, the number of the variable reference voltages $V_{ref}$ is not limited to three but may be four or more. More specifically, when the positive power-supply voltage Vs is detected, after selecting the reference voltage $V_{HC}$ at the time point of Y3 in the second on-period t2, the reference voltage control unit 23 further selects a reference voltage higher than the reference voltage $V_{HC}$ and lower than the reference voltage $V_{HB}$. Thus, the positive power-supply current Is having its waveform closer to a sine wave is obtained. Also, when the negative power-supply voltage Vs is detected, after selecting the reference voltage $V_{LC}$ at the time point of Y4 in the second on-period t2, the reference voltage control unit 23 further selects a reference voltage lower than the reference voltage $V_{LC}$ and higher than the reference voltage $V_{L4}$. Thus, the negative power-supply current Is having its waveform closer to a sine wave is obtained.

Although, in each of the first and second embodiments, the reference voltage $V_{ref}$ that is the threshold values for controlling a value of the power-supply current Is of the AC power supply 1 is varied in each half cycle of the AC power supply 1, the reference voltage $V_{ref}$ may be varied only when the AC power supply is in one polarity, for example, only when the AC power supply is positive.

Although, in each of the first and second embodiments, the short-circuit unit 30 is controlled using the power-supply current Is detected by a current detection unit 7, the control over the short-circuit unit 30 is not limited to this manner described in the above embodiments. A previous test may be performed to make the power-supply current Is correspond to the drive signals Sa1 that are the plurality of switching pulses, and such a correspondence relationship therebetween may be input from the outside or is stored in a control unit 20. This makes it possible to control the short-circuit unit 30 without detecting the power-supply current Is. Whether the detection of a power-supply current Is is necessary may be determined by a constructed system specification.

Although, in each of the first and second embodiments, the drive signal Sa1 is generated by the hysteresis comparator configured by the hardware, such a hysteresis comparator may be configured by software. Even when the hysteresis comparator is configured by the software, the similar effect is achieved. Unfortunately, the use of the software hysteresis comparator increases a high load on a control unit 20, compared to a case where the hardware hysteresis comparator is used. For this reason, in view of a load reduction, the hysteresis comparator is preferably configured by the hardware.

Although the power conversion device 100 of each of the first and second embodiments generates the drive signal Sa1 by using a current detection value detected by the current detection unit 9 provided outside the control unit 20, the control unit 20 may directly detect a value of the power-supply current Is to generate the drive signal Sa1, without using the current detection unit 7.

As described above, the power conversion device 100 according to each of the first and second embodiments includes the rectifier circuit 3 that converts the AC power from the AC power supply 1, into the DC power, the short-circuit unit 30 that short-circuits the AC power supply 1 via the reactor 2 connected between the AC power supply 1 and the rectifier circuit 3, and the control unit 20 that generates the drive signals Sa that are the plurality of switching pulses to control the short-circuit unit 30, in the half cycle of the AC power supply 1. The control unit 20 stepwise varies the reference voltage $V_{ref}$, which is the threshold values that limit a value of the power-supply current Is of the AC power supply 1, in the on-section or the off-section of the plurality of drive signals Sa.

With this configuration, it is possible to boost the DC output voltage Vdc while suppressing the peak of the power-supply current Is, as compared to a conventional simple switching converter. Also, since it is possible to suppress the peak of the power-supply current Is, it is possible to reduce the distortion of the power-supply current Is, when the short-circuit unit 30 is turned on, and hence suppress the harmonic component. Also, since it is possible to suppress the peak of the power-supply current Is, it is possible to extend a conduction period of the power-supply current Is and thus improve the power factor. Also, since it is possible to suppress the peak of the power-supply current Is, it is possible to reduce an increase in a capacity of a filter circuit and other parts of the AC power supply 1 and thus reduce an increase in the cost. Also, according to the power conversion device 100 of each of the first and second embodiments, even in a case where the switching is performed a plurality of times in the half cycle of the power supply, it is unnecessary to design the setting time of each switching pulse and it is possible to design the threshold values at the upper and lower limits of the current corresponding to the positive/negative levels of the power-supply. This makes the control designing relatively easy. Also, according to a power conversion device 100 of each of the first and second embodiments, it is possible to perform the control according to the suitable number of times of the switching and the pulse timing regardless of a load condition. Thus, it is possible to decrease a designing load.

Also, according to the power conversion device 100 of each of the first and second embodiments, since it is possible to vary the reference voltage $V_{ref}$ in the half cycle of the power supply, it is possible to improve a degree of freedom in controlling the power-supply current Is, as compared to a case where the reference voltage $V_{ref}$ is not varied. Also, in a case where the processing capability of a central processing unit is not so high, the hysteresis comparator performs a part of the processing operation of the control unit 20. As a result, the calculation load on the control unit 20 is reduced and thus it is possible to drive the system reliably in a safe operation region without excessive heat generation in the device. On the other hand, in a case where the processing capability of the central processing unit is high, it is possible to drive the system reliably without using the hysteresis comparator. In this case, an area to mount the parts is small. As is clear from the foregoing, it is possible to produce the optimal power conversion device 100 corresponding to the processing capability of the used central processing unit. Also, by varying the reference voltage $V_{ref}$, it is possible to prevent an excessive increase in the switching pulse and reduce a generated noise. Also, by varying the reference voltage $V_{ref}$, it is possible to control the pulse division operation to be performed only in the specific region. Thus, it is possible to reduce a noise due to the switching operation.

Also, the control unit 20 of each of the first and second embodiments may divide and output the drive signal Sa, which is the switching pulse, on the basis of the reference voltage $V_{ref}$ that is the threshold values. Such a configuration achieves the power-supply current Is having its waveform close to a sine wave and hence a power-supply current Is near a peak value of the positive power-supply voltage Vs of easily flows.

Also, the control unit 20 of each of the first and second embodiments may vary the threshold values in the off-section between one switching pulse and another switching pulse in the respective switching pulses. With this configuration, it is possible to reduce a variation in the power-supply current Is. In addition, the calculation load on the control unit 20 is reduced as compared to a case where the threshold values are varied in each of the off-section and the on-section. Thus, it is possible to produce the power conversion device 100 using the relatively low-price central processing unit.

Also, the control unit 20 of each of the first and second embodiments may vary the threshold values in an on-section of a switching pulse generated after the off-section between one switching pulse and another switching pulse in the respective switching pulses. With this configuration, it is possible to reduce a variation in the power-supply current Is. In addition, the calculation load on the control unit 20 is reduced as compared to a case where the threshold values are varied in each of the off-section and the on-section. Thus, it is possible to produce the power conversion device 100 using the relatively low-price central processing unit.

Also, the control unit 20 of each of the first and second embodiments may vary the reference voltage $V_{ref}$, which is the threshold values, in each cycle of the AC power supply 1. With this configuration, it is possible to reduce a variation in the power-supply current Is. In addition, the calculation load on the control unit 20 is reduced as compared to a case where the threshold values are varied in each half cycle of the AC power supply 1. Thus, it is possible to produce the power conversion device 100 using the relatively low-price central processing unit.

Also, the control unit 20 of each of the first and second embodiments may vary the reference voltage $V_{ref}$, which is the threshold values, only when the AC power supply 1 is positive or only when the AC power supply 1 is negative. With this configuration, the calculation load on the control unit 20 is reduced as compared to a case where the threshold values are varied in each half cycle of the AC power supply 1.

INDUSTRIAL APPLICABILITY

As described above, the present invention is useful for a power conversion device including a short-circuit unit that short-circuits an AC power supply.

The invention claimed is:

1. A power conversion device comprising:
a rectifier circuit that converts an AC power from an AC power supply, into a DC power;
processing circuitry that short-circuits the AC power supply via a reactor connected between the AC power supply and the rectifier circuit; and
a controller that, in a half cycle of the AC power supply,
stepwise varies threshold values that limit a value of a power-supply current of the AC power supply,
generates a switching pulse that keeps the value of the power-supply current between the varied threshold values,
performs pulse conversion on the switching pulse according to the varied threshold values into a plurality of switching pulses, and
outputs the plurality of switching pulses as a drive signal for the processing circuitry.

2. The power conversion device according to claim 1, wherein the controller varies the threshold values in an off-section of a switching pulse between one switching pulse and another switching pulse in the switching pulses.

3. The power conversion device according to claim 2, wherein the controller varies the threshold values in the on-section of a switching pulse generated after the off-section.

4. The power conversion device according to claim 1, wherein the controller varies the threshold values in each cycle of the AC power supply.

5. The power conversion device according to claim 1, wherein the controller varies the threshold values only when the AC power supply is positive or only when the AC power supply is negative.

6. The power conversion device according to claim 1, wherein a correspondence relationship between the switching pulse and the power-supply current is set in the controller, and
the controller controls the processing circuitry by using the correspondence relationship.

7. The power conversion device according to claim 1, wherein
the controller includes a pulse conversion unit provided with a plurality of hysteresis comparators and a plurality of logic ICs to perform the pulse conversion on the switching pulse according to the varied threshold values into the plurality of switching pulses.

* * * * *